US009389845B2

(12) United States Patent
Gupta et al.

(10) Patent No.: US 9,389,845 B2
(45) Date of Patent: *Jul. 12, 2016

(54) SYSTEM AND METHOD FOR DYNAMICALLY GENERATING A USER PERSONALIZED DOWNLOADABLE EXECUTABLE FILE

(75) Inventors: Puneet Gupta, Bangalore (IN); Akshay Darbari, Allahabad (IN); Venkat Kumar Sivaramamurthy, Bangalore (IN); Sudhakar Vusirika, Vijayawada (IN)

(73) Assignee: Infosys Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,778

(22) Filed: Mar. 15, 2012

(65) Prior Publication Data
US 2013/0104113 A1   Apr. 25, 2013

(30) Foreign Application Priority Data
Oct. 24, 2011   (IN) .......................... 3628/CHE/2011

(51) Int. Cl.
*G06F 9/44*   (2006.01)
*G06F 9/445*   (2006.01)

(52) U.S. Cl.
CPC ................ *G06F 8/61* (2013.01); *G06F 9/4451* (2013.01)

(58) Field of Classification Search
CPC ........... G06F 8/61; G06F 8/65; G06F 9/4451; G06F 9/44505
USPC ................................................. 717/169, 172
See application file for complete search history.

(56) References Cited

U.S. PATENT DOCUMENTS

| 7,570,943 | B2 | 8/2009 | Sorvari et al. |
| 7,571,434 | B1* | 8/2009 | Kamen et al. ................ 717/154 |
| 7,873,710 | B2 | 1/2011 | Kiley et al. |
| 2004/0098421 | A1* | 5/2004 | Peng ........................ G06F 8/61 |
| 2007/0088837 | A1 | 4/2007 | Gidron et al. |
| 2007/0240152 | A1* | 10/2007 | Li et al. .......................... 717/174 |
| 2009/0119678 | A1* | 5/2009 | Shih et al. ..................... 719/313 |
| 2009/0254912 | A1* | 10/2009 | Roundtree et al. ............ 718/102 |

(Continued)

OTHER PUBLICATIONS

Gui et al., "Artificial Intelligence Approach of Context-Awareness Architecture for Mobile Computing", IEE Xplore, 2006, p. 1 of Abstract.
Hawick et al., "Middleware for Context Sensitive Mobile Applications", Australian Computer Society, Inc., 2003.

(Continued)

*Primary Examiner* — Duy Khuong Nguyen
(74) *Attorney, Agent, or Firm* — LeClairRyan, a Professional Corporation

(57) ABSTRACT

In an aspect, a system, non-transitory machine readable medium and method for providing a personalized executable file to a client device is disclosed. A request sent from a client device to obtain a software application is received. The request is processed to identify the client device and a user associated with the client device. The client device profile information associated with the identified client device as well as user profile information associated with the identified user is determined. One or more configuration/core library files are selected from a file database based on the user profile information and the client device profile information. A personalized executable file is generated for the requested software application, wherein the personalized executable file comprises selected core library files and the selected configuration files. The personalized executable file of the requested software application is then sent to the client device.

19 Claims, 4 Drawing Sheets

(56) References Cited

U.S. PATENT DOCUMENTS

2009/0276439 A1* 11/2009 Rosenblatt ........ G06F 17/30058
2011/0231872 A1   9/2011 Gharachorloo et al.
2012/0254768 A1* 10/2012 Aggarwal ........... G06F 9/44505
                                                    715/744

OTHER PUBLICATIONS

Hess et al., "An Application of a Context-Aware File System", Pers Ubiquit Comput, 2003, pp. 339-352.

Repo et al., "Middleware Support for Implementing Context-Aware Multimodal User Interfaces", MUM, 2004, pp. 221-227.

* cited by examiner

SYSTEM AND METHOD FOR DYNAMICALLY GENERATING A USER PERSONALIZED DOWNLOADABLE EXECUTABLE FILE

STATEMENT OF RELATED APPLICATION

The present application claims the benefit of priority under 35 U.S. C. 119(b) to Indian Patent Application Serial No. 3628/CHE/2011 filed Oct. 24, 2011, in the name of inventors Puneet Gupta, Akshay Darbari, Venkat Kumar Sivaramamurthy, and Sudhakar Vusirika, entitled "System And Method For Dynamically Generating A User Personalized Downloadable Executable File", all commonly owned herewith.

FIELD

The present disclosure relates to a system and method for dynamically generating a personalized downloadable executable file based on user and client device profile information.

BACKGROUND

Software applications are extremely popular in today's computing world. In particular, with the increase in popularity with mobile application stores and marketplaces, users are able to download software applications on demand using their client devices. Currently, when a client device requests to download a software application, one or more servers provide an executable file that is packaged with an established set of configuration files.

Currently there are different ways to handle device diversity issues. One such method is to have the software applications prebuilt for multiple client devices, whereby each client device would download its respective prebuilt software application. This would be undesired due to the number of different client devices that are available for a particular software application. Another method is to configure the software application to have all the components that are required by all different available client devices, whereby the application would be required to selectively handle the adaptations at run time based on the particular requesting client device. This would be disadvantageous as the result would be a software application that is extremely large in size. Another method would be to design the software application to have only features that can be utilized by all of the available client devices. This is undesired as the software application would not allow more powerful client devices to take advantage of potentially more powerful features that could otherwise be offered in the software application.

What is needed is a system and method which takes into account user profile information along with profile information of the client device to generate a personalized software application that is able to take advantage of the user's profile information and the device's profile information while minimizing its overall file size.

SUMMARY

In an aspect, a method for providing a personalized executable file to a client device is disclosed. The method comprises receiving a request sent from a client device to obtain a software application. The method comprises processing the request, using one or more processors, to identify the client device and a user associated with the client device. The method comprises determining client device profile information associated with the identified client device and determining user profile information associated with the identified user. The method comprises selecting one or more configuration files from a file database, wherein the one or more configuration files are selected based on at least the user profile information and the client device profile information. The method comprises generating a personalized executable file for the requested software application, wherein the personalized executable file comprises one or more core library files and the one or more selected configuration files. The method comprises sending the personalized executable file of the requested software application to the client device.

In an aspect, a non-transitory machine readable medium is disclosed. The medium, having stored thereon, instructions for providing a personalized executable file to a client device. The medium comprises machine executable code which when executed by at least one machine, causes the machine to receive a request sent from a client device to obtain a software application. The machine is further configured to process the request to identify the client device and a user associated with the client device. The machine is further configured to determine client device profile information associated with the identified client device. The machine is further configured to determine user profile information associated with the identified user. The machine is further configured to select one or more configuration files from a file database, wherein the one or more configuration files are selected based on at least the user profile information and the client device profile information. The machine is further configured to generate a personalized executable file for the requested software application, wherein the personalized executable file comprises one or more core library files and the one or more selected configuration files. The machine is further configured to send the personalized executable file of the requested software application to the client device.

In an aspect, a computer system comprises a network interface that is configured to allow communications with one or more client devices over a network. The computer system comprises a memory configured to store code representative of instructions for providing a personalized executable file to a client device. The computer system comprises a processor coupled to the network interface and the memory. The processor is operative to execute the code to cause the processor to receive a request sent from a client device to obtain a software application and process the request to identify the client device and a user associated with the client device. The processor is operative to determine client device profile information associated with the identified client device. The processor is operative to determine user profile information associated with the identified user. The processor is operative to select one or more configuration files from a file database, wherein the one or more configuration files are selected based on at least the user profile information and the client device profile information. The processor is operative to generate a personalized executable file for the requested software application, wherein the personalized executable file comprises one or more core library files and the one or more selected configuration files and send the personalized executable file of the requested software application to the client device via the network interface.

In an aspect, a method for providing a personalized executable file to a client device is disclosed. The method comprises receiving a request sent from a client device to obtain a software application. The method comprises processing the request, using one or more processors, to identify the client device and a user associated with the client device. The method comprises determining client device profile information associated with the identified client device. The method comprises determining user profile information associated with the identified user, wherein the user profile information includes subscription information of the user. The method comprises selecting one or more configuration files from a file database, wherein the one or more configuration files are selected based on at least the user profile information and the client device profile information. The method comprises generating a personalized executable file for the requested software application, wherein the personalized executable file comprises one or more core library files and the one or more selected configuration files. The method comprises sending the personalized executable file of the requested software application to the client device.

In one or more of the above aspects, it is determined whether the identified user has an account stored in a user database and user profile information associated with the identified user from the user account is retrieved. In one or more of the above aspects, user preference information is received from the user and the received user preference information is stored in an account associated with the user in a user database. In one or more of the above aspects, information of the sent personalized executable file is stored to an account associated with the user and an update request is received from the client device to receive an updated version of the software application.

In one or more of the above aspects, the update request is processed and information of the sent personalized executable file is retrieved from the user database to identify one or more files associated with the previously sent software application that have an updated version in the file database. Additionally, one or more updated files are retrieved from the file database and at least the one or more updated files is sent to the client device, wherein the one or more updated files are configured to cause the client device to operate the updated version of the software application.

In one or more of the above aspects, the user profile information includes service subscription information associated with the user and the client device.

In one or more of the above aspects, preference information of the user is requested via the client device regarding one or more user preferences. Information is received from the user via the client device and the user profile of the user is updated with the received information and storing the updated user profile in the user's account.

DETAILED DESCRIPTION

In general, the present disclosure is directed to a system, non-transitory machine/computer readable medium and method through which one or more servers are configured to provide an executable file of a requested software application that is customized based on the preferences and profile of the user and the capabilities of the requesting user's client device.

The present system and method takes into account user profile and preference information along with profile information of the client device to select the core library files and configuration files that are relevant to the user's profile and/or preferences as well as the client device's capabilities. The present system and method compiles the selected one or more configuration files with selected one or more core library files that are associated with the requested software application to generate and transmit a customized or personalized final executable file tailored to the user and his/her client device.

Figure 1:
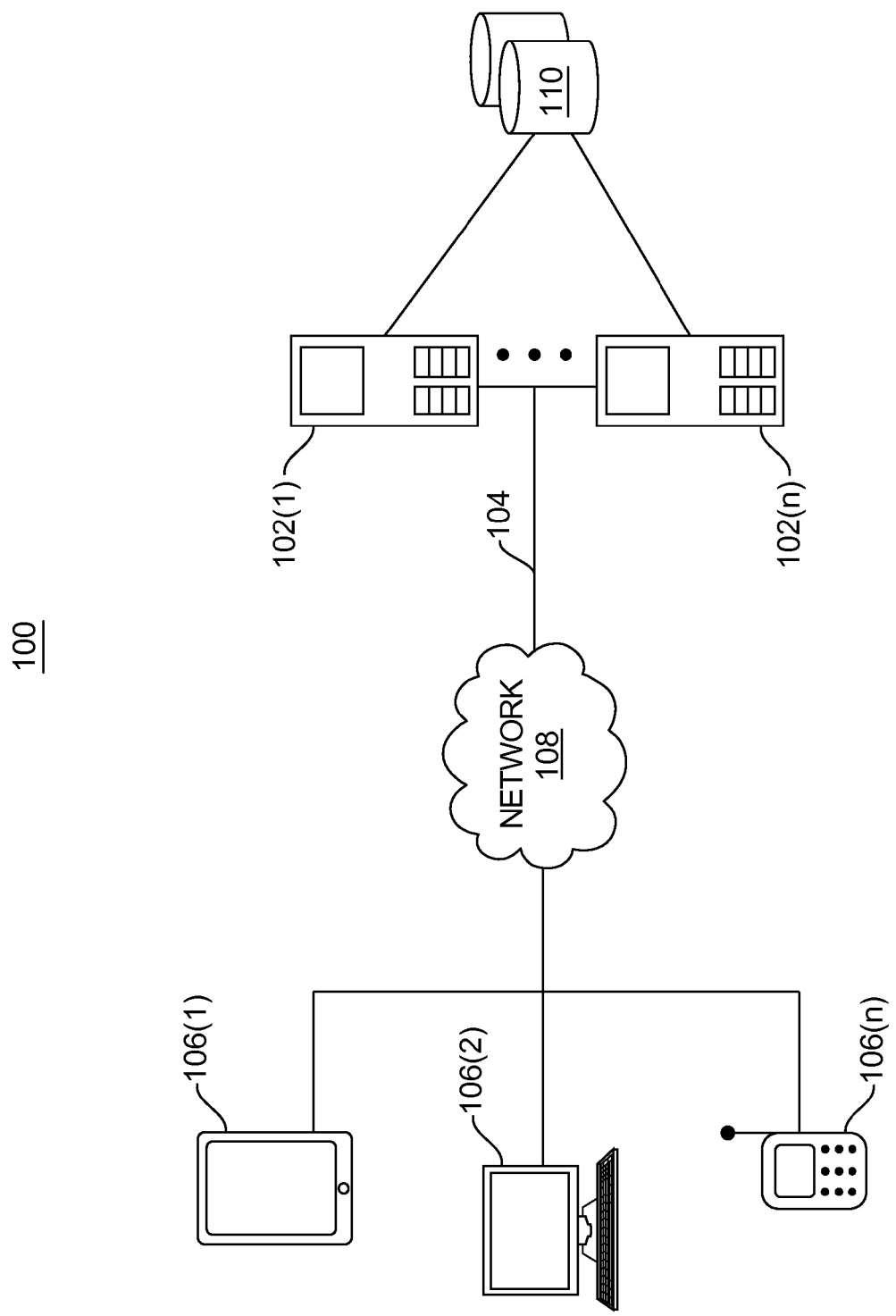
FIG. 1 illustrates an example system including a network device implementing an application module in accordance with an aspect of the present disclosure.

FIG. 1 illustrates a diagram of an example system environment that implements and provides a user/client device-based customizable or personalized executable file to one or more client devices in accordance with an aspect of the present disclosure. In particular, the example system environment 100 includes a plurality of network devices. It should be noted that the term "network devices" can be referred to as encompassing one or more client devices, one or more physical and/or virtual servers, cloud computing devices and/or other components in the system 100.

The servers 102(1)-102(n) include but not are limited to application servers, database servers, content servers, computation farms, data centers, virtual machines, cloud computing devices, mail or web servers and the like. The servers 102(1)-102(n) are connected to a local area network (LAN) 104 (e.g. private area network) and the wide area network 108. The servers 102(1)-102(n) are capable of operating one or more Web-based and/or non Web-based applications that may be accessed by other network devices (e.g. client devices, other servers) via the network 108 and/or LAN 104. One or more servers 102(1)-102(n) may be front end and/or back end Web servers, content servers, application servers, and/or database servers. Such data includes, but is not limited to Web page(s), image(s) of physical objects, user account information, and any other objects and information. It should be noted that the servers 102(1)-102(n) may perform other tasks and provide other types of resources. In particular to an aspect, the one or more servers 102(1)-102(n) may provide and manage a platform configured to provide software applications to one or more requesting client devices 106(1)-106(n). For example, the one or more servers 102(1)-102(n) may be configured to provide mobile software applications (e.g. mobile apps) that are transmitted over the network 108 to one or more client devices 106(1)-106(n), whereby the client device receives/downloads and operates the software applications.

One or more servers 102 may comprise a cluster of a plurality of servers which are managed by a network traffic device such as a firewall, load balancer, web accelerator, gateway device, router, hub and the like. In an aspect, one or more servers 102(1)-102(n) may implement a version of Microsoft® IIS servers, RADIUS servers and/or Apache® servers, although other types of servers may be used and other types of applications may be available the on servers 102(1)-102(n). It should be noted that although the client device, network management system, and/or server may be referred to herein in the plural, it is contemplated that only one client device, one network management system, and/or one server may be considered without being limiting to the language used herein. It should be understood that the particular configuration of the system 100 shown in FIG. 1 are provided for exemplary purposes only and is thus not limiting.

Client devices 106(1)-106(n) comprise network computing devices capable of connecting to other computing devices, such as the servers 102(1)-102(n). Such connections are performed over wired and/or wireless networks (e.g. WiFi, mobile networks), such as network 108, to send and receive data, such as Web-based and/or non Web-based requests, receiving responses to requests and/or performing other tasks, in accordance with the novel processes described herein. Non-limiting and non-exhausting examples of such client devices 106(1)-106(n) include, but are not limited to, personal computers, mobile phones and/or smart phones, pagers, tablet devices, smart TVs, multimedia systems, smart DVD players, video game systems, PDAs and the like. In particular to an aspect of the present disclosure, the client device 106 is configured to access an enterprise platform managed by one or more servers 102 which allows one or more software applications (i.e. "apps") to be selected and easily downloaded to the client devices.

In an aspect, a client device may be configured to run a Web browser, dedicated client module, or other software module that provides a user interface for human users to interact with and access the design module 210. In an aspect, the client device may locally store the software application which allows the user to request resources and/or information from one or more servers via the mobile application. In another aspect, the client device may be configured for on-demand access to a remote server and/or storage device which stores the software application to run the software application.

Network 108 comprises a publicly accessible network, such as the Internet, which handles communication between the client devices 106(1)-106(n) and the servers 102(1)-102(n). However, it is contemplated that the network 108 may comprise other types of private and/or public networks. Communications between the client devices 106(1)-106(n) and the servers 102(1)-102(n) preferably take place over the network 108 according to network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies.

Figure 2:
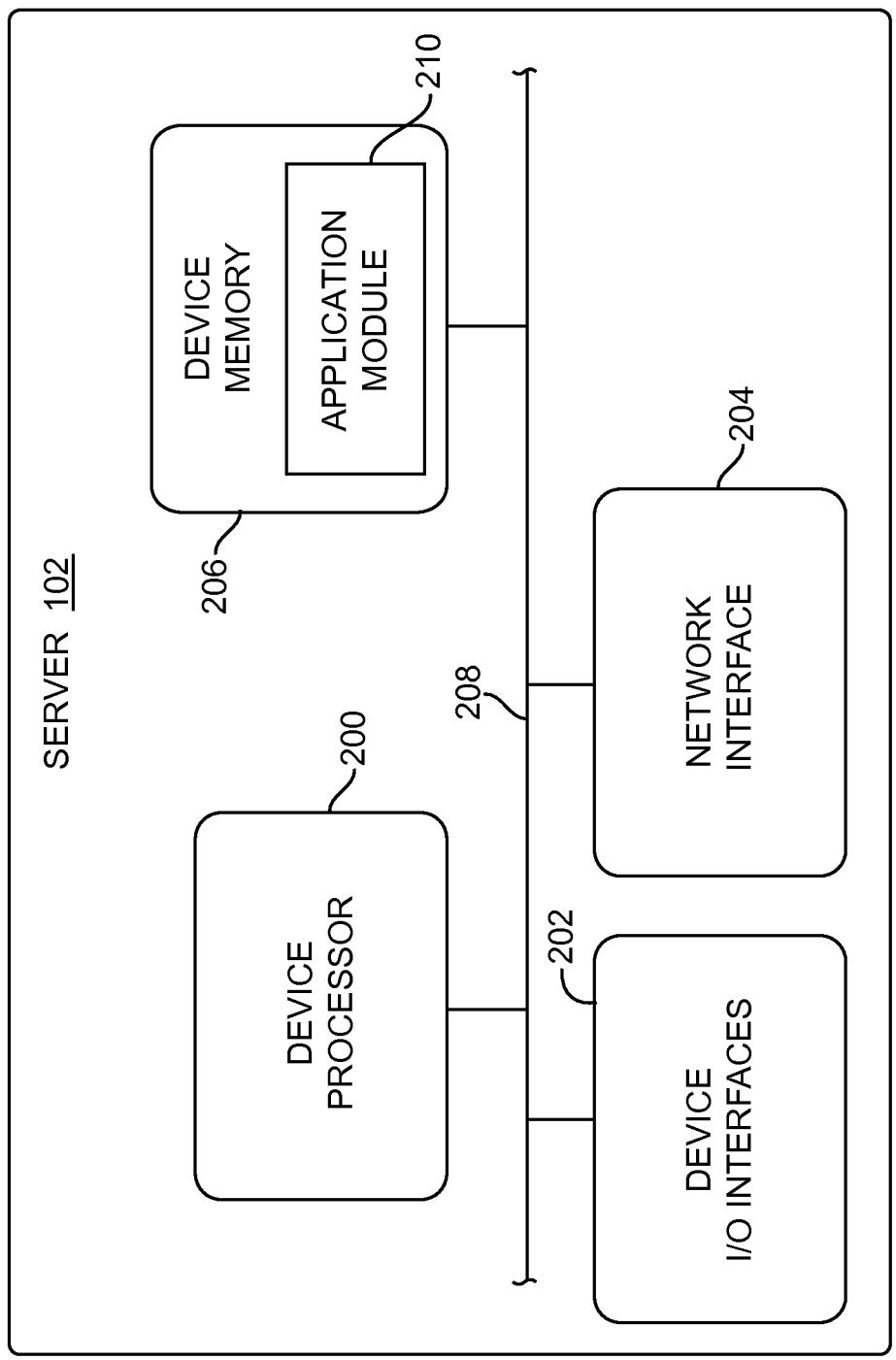
FIG. 2 illustrates a block diagram of a network device implementing the application module in accordance with an aspect of the present disclosure.

FIG. 2 illustrates a block diagram of a network device in accordance with an aspect of the present disclosure. With regard to FIG. 2, the network device may be one or more provider servers 102, such as an application server or content server. The server 102 includes one or more device processors 200, one or more device I/O interfaces 202, one or more network interfaces 204 and one or more device memories 206, all of which are coupled together by one or more buses 208. It should be noted that the server 102 could include other types and numbers of components.

Device processor 200 comprises one or more microprocessors configured to execute non-transitory computer/machine readable and executable instructions stored in the respective local or remote device memory 206. Such instructions are implemented by the processor 200 to perform one or more functions described below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured to execute the process in accordance with the teachings as described and illustrated herein of the novel system and method described below.

Device I/O interfaces 202 comprise one or more user input and output device interface mechanisms. The interface may include a computer keyboard, mobile device keypad, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding device and the like.

Network interface 204 comprises one or more mechanisms that enable the server 102 to engage in TCP/IP communications or other communications over the LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets over one or more networks, such as LAN 104 and network 108.

In an example where the server 102 includes more than one device processor 200 (or a processor 200 has more than one core), each processor 200 (and/or core) may use the same single network interface 204 or a plurality of network interfaces 204 to communicate with other network devices, such as the client device 106. Further, the network interface 204 may include one or more physical ports, such as Ethernet ports, to couple its respective device with other network devices in the system 100. Moreover, the network interface 204 may include certain physical ports dedicated to receiving and/or transmitting certain types of network data, such as device management related data for configuring the respective device, and the like.

Bus 208 may comprise one or more internal device component communication buses, links, bridges and supporting components, such as bus controllers and/or arbiters. The bus enable the various components of the network device such as the processor 200, device I/O interfaces 202, network interface 204, and device memory 206, to communicate with one another. However, it is contemplated that the bus may enable one or more components of its respective network device to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network device which houses the bus.

Device memory 206 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200. As shown in FIG. 2, the application module 210 is shown within the memory 206 and comprises computer readable/machine executable instructions. It is contemplated that the application module 210 may alternatively be housed in a storage medium external to the memory 206. Such stored instructions allow the processor 200 to perform actions, including implementing an operating system for controlling the general operation of the server 102 to perform one or more portions of the novel process described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed.

As shown in FIG. 2, the server 102 includes an application module 210 shown within the memory 206 (although the application module 210 may reside elsewhere within or exterior to the server 102). As will be discussed in more detail below, the application module 210 is a software-based component that comprises non-transitory machine readable code which, when executed by one or more processors, causes the one or more processors to perform some or all of the functions described in FIGS. 3 and 4.

In general, the present disclosure is directed to a system, non-transitory machine/computer readable medium and method through which one or more servers 102 are configured to provide executable files of requested software application that are customized based on the profile and/or preferences of the user and the capabilities of the requesting user's client device 106.

As mentioned above, software applications available for download are monolithic in nature include an established set of core library files and a set of one or more configuration files, all of which are preselected and established by the software application's developer. In existing systems, when a client device requests to download a software application, the server provides the client device with a monolithic application that is not customizable based on the user and his/her device. Considering that software applications are typically designed to be a "one size fits all" type of program, the core library files and configuration file contain code which may not be applicable and/or used by the client device.

To solve this problem, the present system and method takes into account user profile information, such as the user's specific information preferences and service subscription information, along with profile information specific to his/her client device to generate a software application that is personalized to the user and his/her client device. The present system and method selects one or more core library files and one or more configuration files that are relevant and appropriate for the user and his/her client device to generate and transmit a personalized or customized final executable file.

In an example, the user, via his/her client device 106, may request to download a particular software application which has a plurality of available features. Some example features of the software application may include, but are not limited to, SMS messaging, geo-tagging and synchronization features. However, in the example, if the requesting client device 106 does not have GPS capabilities, it will not need to download any files of the software application that implement the geo-tagging feature. Further, if the user is subscribed to a service plan which charges the user per SMS message that is sent or received, he/she may prefer that the SMS feature not be enabled in the downloaded software application. In an aspect, the application module 210 can access one or more service subscriber databases to obtain specific information of the particular mobile or internet services that the user is currently signed up to receive. The application module 210 can leverage this service subscription information to better select the features that may likely be used by the user on his/her client device. Alternatively, the application module 210 can leverage the service subscription information to better avoid features that would most likely not be used by the user.

Accordingly, the provider server 102, taking into account this information about the user and the device 106, generates a customized or personalized version of the software application and then delivers the customized version of the software application to the client device 106. The present system and method is thereby able to selectively generate or "build" the requested software application based on the user's profile/preference(s) and capabilities of his/her client device 106.

In an aspect, the application module 210 of the provider server 102 is able to identify a requesting user upon processing a request received from the user's client device 106. In particular, the request will contain information of the user and the client device in the request header and/or body (e.g. HTTP, HTTPS). As mentioned, the application module 210 utilizes information of the user in generating the customized executable file of the requested software application. Such user specific information may include, but is not limited to, specific information of the user along with his/her preferences and is stored by the application module 210 in a user profile. Such information includes, but is not limited to, the user's demographics (e.g. residence information, language spoken), user specified themes, stored ringtones, the user's current service subscription plan, the user's current account status, the user's mobile carrier, settings that the user prefers to enable/disable, other applications currently stored on the user's device, information of the user that is shared or updated at the time of service registration and the like. In an aspect, with the user's prior authorization, the client device 106, using a client agent, may search stored files in the user's device to retrieve information of the user to note in the user's profile. In an aspect, the application module 210 of the server 102 may send one or more questions or queries to the user's client device 106 to obtain user profile information. The application module 210 is configured to store all profile information as well as profile information of the client device in a user account stored in one or more user databases.

In an aspect, the application module 210 can access one or more subscriber databases to obtain specific information (with the user's prior authorization) of the user's status or subscription plan from the user's subscription provider, in which sought out information would be specifically relevant to the requested software application. For example, the application module 210 may request user's subscription information in relation to mobile or internet services if it is relevant to the requested software application. The application module 210 can leverage this subscription information to better select files that are associated with features that may likely be used by the user on his/her client device 106. Alternatively, the application module 210 can leverage the subscription information to better avoid features that would most likely not be used by the user.

In an example, the user may request to download a software application which allows access to services offered by his/her bank. In retrieving the user's subscription information of his account for that bank, the application module 210 may obtain information indicating that the user has preferential or VIP status. Accordingly, the application module 210 can select one or more library and/or configuration files related to premium features offered only to VIP customers in the software application.

In another example, a user may request to download a software application that has a SMS feature. The application module 210 may retrieve the user's subscription information which indicates that the user is not signed up to receive SMS messages on his/her phone through his/her phone's service provider. In leveraging this information about the user, the application module 210 would not select any library and/or configuration files directed to SMS functionality in generating the final executable file.

The application module 210 of the provider sever 102 is also configured to identify the requesting client device by processing information in header and/or the body of the request (e.g. HTTP/HTTPS request) sent from the device 106. Regarding the client device 106, the application module 210 is able to utilize profile information of the requesting device 106 by retrieving information of the device's capabilities from one or more look up tables in one or more device databases. The device's profile information can include, but is not limited to, manufacturer and model information of the device, processor and processing capabilities, country where screen size, screen resolution, audio capabilities, video/sound card information, internal/external storage capabilities, physical dimensions of the device, registered phone number of the device, its available features (e.g. geotagging, camera, 3-D capability) and the like. In an aspect, the application module 210 may simply request such information directly from the user of his/her device 106 in the form of questions within or external to the requested software application.

Based on the user's profile information as well as the client device's profile information, the application module 210 is able to determine which one or more core library files and/or one or more configuration files to select based on the user's profile information as well as profile information of his/her client device 106. In an aspect, core library files include a collection of subroutines which facilities the software application in performing its functions. In an example, a software application may include a location-based services library that have library files which facilities tasks such as retrieving the location of the user, plotting the location of user on the map and the like. In an example, the software application may include a database library has files that facilitate creation, addition, modify/append, and deletion of files of one or more databases. Configuration files include, but are not limited to, image files, style sheets, language packs, default settings, specific features (e.g. tethering capabilities, GPS/geotagging features) and the like. The application module 210 generates the executable file for a software application by compiling one or more configuration files with the one or more core library files.

Figure 3:
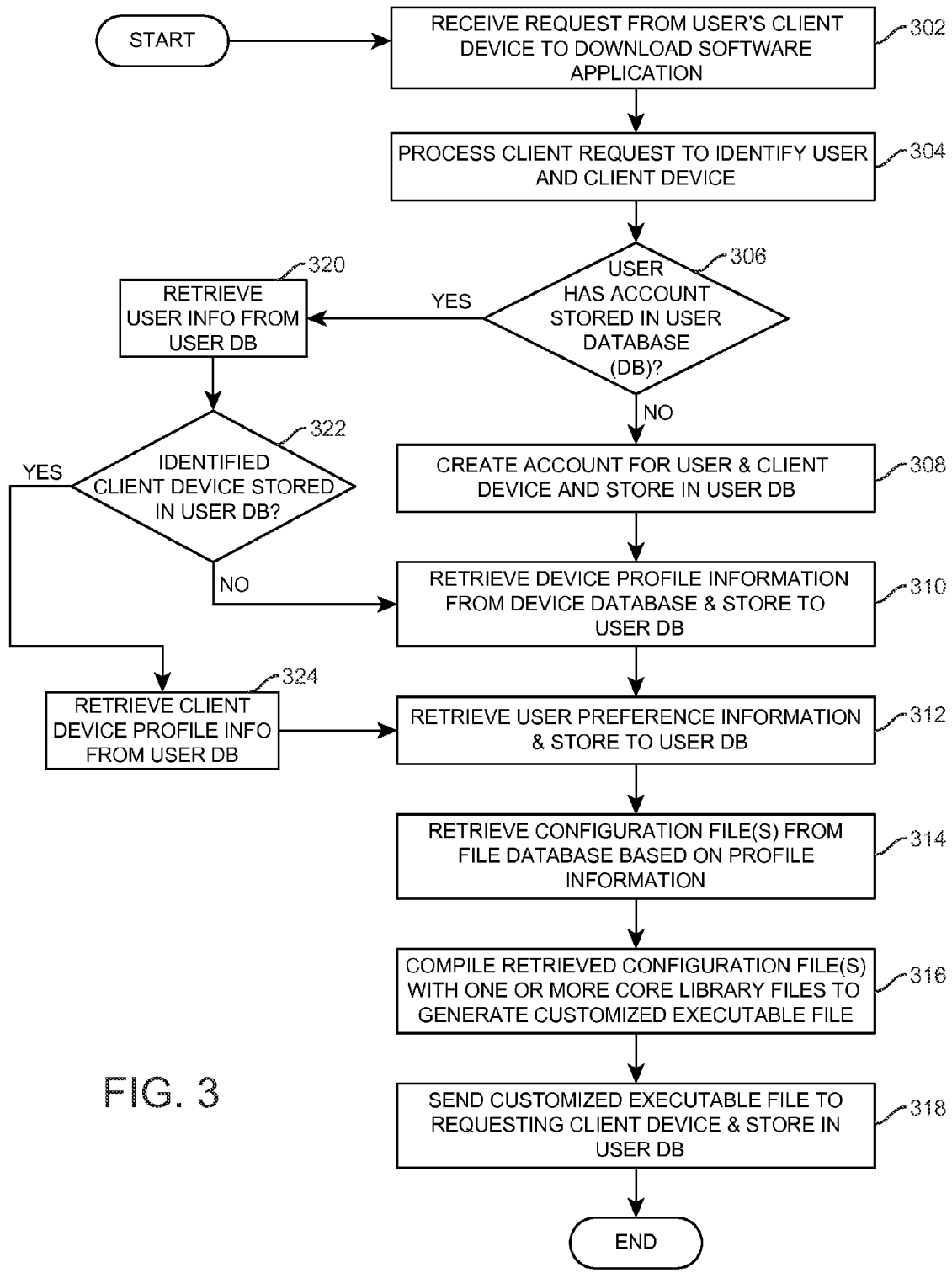
FIG. 3 illustrates a flowchart of a method for generating a customized downloadable executable file based on at least user/client device profile information in accordance with an aspect of the present disclosure.

FIG. 3 illustrates a flowchart of a method for generating a customized or personalized downloadable executable file based on at least client device and user profile information in accordance with an aspect of the present disclosure. It should be noted that the steps shown in FIG. 3 are exemplary to the described process and may include additional/different steps.

As shown in FIG. 3, the process begins at the Start Block in which one or more network devices, such as one or more providers servers 102 receives a request over the network 108 from a user using a client device 106. The request received at the application module 210 of the provider server is for the client device 106 to receive some or all of a software application for download (Block 302). In another aspect, the request from the client device 106 is to download one or more update configuration and/or core library files of the software application, as described in relation to FIG. 4.

Once the request is received at the server 102, the application module 210 of the server 102 parses the client request, such as header information and/or information in the body of the request, to identify the user and the client device 106 from which the request was sent (Block 304). In an aspect, the client device 106 can be identified by the application module 210 by using information provided in the received HTTP/HTTPS request. In aspect, the client device can be identified by the device's unique identification information and/or mobile number that may be included in the request header and/or body. The application module 210 can identify the user upon identifying the client device 106 and accessing a user database. In an aspect, the application module 210 can request the user's credentials in case the user has an account in the user database.

Once the user and the client device 106 are identified, the application module 210 determines whether the user already has an account stored in one or more user databases (Block 306). If the application module 210 determines that the user does not have a stored account, the application module 210 creates an account for the user and stores the newly created user account in one or more user databases (Block 308). Considering in this example that the user does not have an account, the application module 210 automatically retrieves client device profile information from a device database and stores the client device profile information in the user's account in the user database (Block 310). As stated above, the device profile information may include specification and capability information of client device's 106 hardware and/or software. Such profile information includes, but is not limited to, manufacturer and model information of the device, processor and processing capabilities, screen size, screen resolution, audio capabilities, video/sound card information, internal/external storage capabilities, physical dimensions of the device, registered phone number of the device and the like.

In an aspect, the application module 210 may retrieve user profile information of the user, whereby the user profile information is utilized by the application module 210 to further customize the requested software application prior to sending it to the client device 106 (Block 312). In an aspect, the application module 210 may retrieve the user's profile information from the user's account. In an aspect, the application module 210 may receive subscription information of the user as user profile information, whereby one or more core library and/or configuration files are selected based on the subscription information. Additionally or alternatively, the application module 210 sends one or more questions to the user's client device 106, whereby the question(s) attempt to retrieve user profile information. The question(s) may be general preference questions and/or may be specific to the requested software application. In either event, it is contemplated that the application module 210 will store the retrieved user profile/preference information in the user database under the user's account.

Based on the obtained client device profile information and user profile/preference information, the application module 210 is able to select and retrieve one or more core library files and/or one or more configuration files, from one or more file databases that are relevant, appropriate and tailored to the user's and hardware and software capabilities of his/her client device (Block 314). As stated above, the configuration files include, but are not limited to, appropriate image files, style sheets, language packs, default settings, specific features (e.g. tethering capabilities, GPS/geotagging features) and the like. The application module 210 also utilizes user profile/preference information to select one or more configuration files directed to theme configurations, language packs, personalized visual and/or audio features, subscription based features, as well as features relating to the user's interests/hobbies.

Thereafter, the application module 210 file combines or compiles the one or more selected configuration files with the one or more selected core library files to generate a final, customized/personalized executable file (Block 316). In an aspect, once the final, customized executable file is generated, the server 102 transmits the final executable file over the network 108 to the requesting client device 106 in which the client device 106 stores the received executable file in a local memory and runs the software application in accordance with the device's capabilities and the user's preference/profile information. (Block 318). It should be noted, in another aspect, that the server 102 may transmit the final executable file to one or more storage and/or server devices remote from the requesting device 106, whereby the requesting device can run the software application by accessing the remote storage/server device.

In addition, the application module 210 stores information of the final executable file under the user's account in one or more databases. In particular to an aspect, the entire contents of the final executable file can be stored in the database. Alternatively, information of each of the files (e.g. name, location, version number, date of generation) of the final executable file can be stored in the database. By storing information of the final executable file in the user database, the application module 210 can identify the selected core library files and configuration files that were sent if the client device requests the software application again or if the client device requests an updated version of the software application (FIG. 4).

Returning to Block 306, if the application module 210 of the provider server determines that the user has an account, the application module 210 retrieves previously stored user profile and/or preference information from the user's account (Block 320). Additionally, the application module 210 can determine, from the user's account, if there is previously stored client device profile information (Block 322). If so, the application module 210 retrieves client device 106 profile information from one or more databases (e.g. user database) (Block 324), whereby the process proceeds to Block 312. If not, the process proceeds to Block 310.

As stated above, the customized final executable file generated by the application module 210 is specifically tailored to the user's profile/preferences and the client device 106, such that the final executable file includes the one or more core library files and the one or more configuration files that are selected by the application module based on the user's profile/preference information and the profile information of his/her client device 106. In other words, by generating a customized executable file, core library files and/or configuration files which are not needed by the client device 106 or desired by the user are not transmitted by the server 102. This results in a decrease in the overall size of the final executable file that is transmitted to the requesting client device 106.

Figure 4:
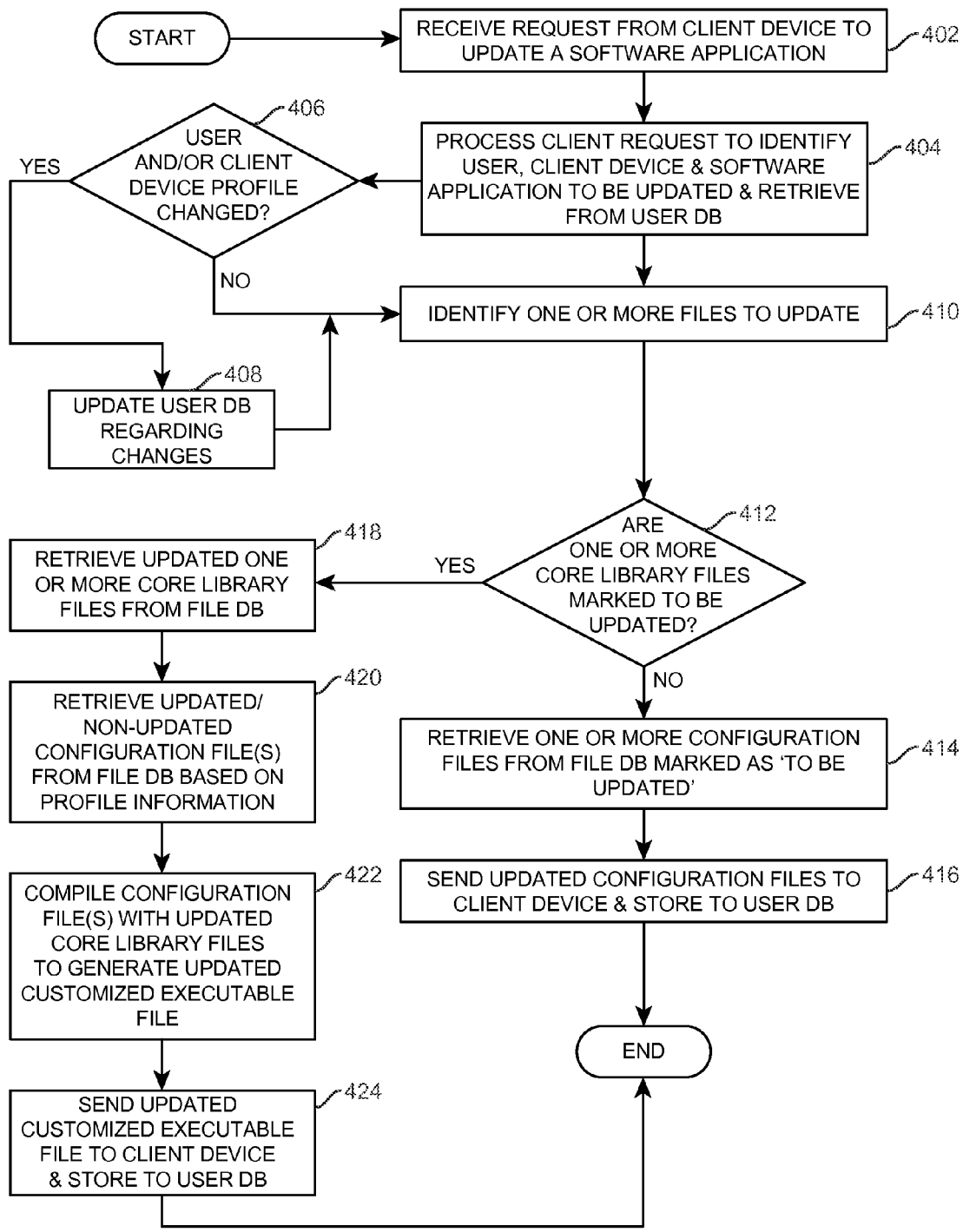
FIG. 4 illustrates a flowchart of a method for providing one or more updated customized file based on at least user/client device profile information in accordance with an aspect of the present disclosure.

FIG. 4 illustrates a flowchart of a method for selectively downloading one or more updated configuration to a requesting client device in accordance with an aspect of the present disclosure. It should be noted that the steps shown in FIG. 4 are exemplary to described process and may include additional/different steps.

As shown in FIG. 4, the process begins at the Start Block in which one or more network devices, such as provider server 102 receives a request over the network 108 from a user using a client device 106. In particular, the request from the client device 106 is to obtain one or more updated files associated with a previously downloaded version of the software application (Block 402).

In an aspect, the request from the client device may be received as a result of the user being notified that an updated version of the previously downloaded software application is currently available for download. In an aspect, the application module 210 may be informed the user's and/or device's profile has changed (e.g. subscription change, new device, new hardware/software services added/deleted), whereby an update notification is sent to the user. Upon the user receiving this notification on his/her client device, the user may simply select an "Update" button or perform other similar functions which result in the client device 106 sending the update request to the server 102.

In an aspect, the application module 210 will send the one or more updated core library files and/or configuration files to the client device 106 in conjunction with the user's profile/preference and the client device's profile information. In an aspect, the update may involve an update to one or more of the core library files. In this aspect, the application module 210 will compile the updated one or more of the core library files with the one or more (updated or non-updated) configuration files to generate an updated personalized or customized final executable file to thereafter send to the client device 106.

Once the update request is received at the server 102, the application module 210 parses the client request, such as header information and/or information in the body of the request, to identify the user as well as the requesting client device (Block 404).

Once the user and the client device 106 are identified, the application module 210 can optionally determine whether the user profile/preference information and/or client device profile has changed with respect to the settings stored in the user's account (Block 406). As discussed in relation to Block 312 in FIG. 3, the application module 210 may request information directly from the user and/or contact one or more databases/service subscriber databases to retrieve information of the user to apply to the user's profile. If the profile/preference information has changed, the application module 210 retrieves updated information of the user and/or client device and stores the updated information in user's account in the user database (Block 408). Whether updated user and/or client device information is available or not, the process proceeds to Block 410.

Thereafter, the application module 210 identifies which files of the previously downloaded software application need to be updated (Block 410). As stated above, the application module 210 stores information of the previously downloaded application under the user account and is thus able to identify the customized final executable file that was previously transmitted to the client device 106. In particular, the application module 210 is able to identify which core library files/configuration file(s) were selected in the previous version of the software application.

In an aspect, the application module 210 determines whether the one or more of the core library files of the software application has been marked as being updated (Block 412). If not, the application module 210 retrieves the one or more previously selected configuration files that are marked as being updated (Block 414). The application module 210 then sends only the updated configuration files to the client device 106 (Block 416). In addition, the application module 210 stores information of the updated configuration files under the user's account in the user database. The client device 106, upon receiving the one or more updated configuration files, is able to process and incorporate them with the previously downloaded customized executable file. As a result, the client device 106 is not provided and thus does not download the entire executable file in the case that only one or more configuration files need to be updated.

Returning to Block 412, if the application module 210 determines that at least one of the files marked as updated is the one or more of the core library files, the application module 210 retrieves the updated one or more of the core library files from the file database (Block 418). The application module 210 also identifies and retrieves the one or more configuration files that it selected earlier from the previously sent customized version of the software application (Block 420). As shown in Block 420, one or more of the retrieved configuration files may be updated or non-updated. In an aspect, the application module 210 compiles the one or more (updated and/or non-updated) configuration files with the updated files to generate an updated, customized executable file (Block 422). Alternatively, Block 422, as described for 416, the application module 210 may send the one or more core library and/or configuration files to the client device instead of a compiled updated, executed file.

In an aspect, once the updated customized executable file is generated, the provider server 102 transmits the updated customized executable file over the network 108 to the requesting client device 106 (Block 424). In addition, the application module 210 stores information of the updated customized executable file under the user's account in the user database. This is advantageous as less data need to be sent over the network between the server 102 and the client device 106. Additionally, the client device 106 utilizes less computational resources during an update in comparison to existing updating implementations.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A method for providing a personalized executable file to a client device, the method comprising:
   processing, by an application management computing device, a received request sent from a client device to obtain a software application, wherein the processing comprises identifying the client device and a user associated with the client device;
   determining, by the application management computing device, client device profile information associated with the identified client device and user profile information associated with the identified user;
   selecting, by the application management computing device, one or more core library files based on at least the determined client device profile information and subscription information associated with the user and one or more configuration files based on at least the determined user profile information and the subscription information associated with the user for the requested software application from a file database;
   generating, by the application management computing device, a custom personalized executable file of the requested software application, wherein the personalized executable file comprises the one or more selected core library files associated with the determined client device profile information and the one or more selected configuration files associated with the determined user profile information;
   sending, by the application management computing device, the personalized executable file of the requested software application to the client device;
   identifying, by the application management computing device, one or more updated files associated with the previously sent personalized executable file of the requested software application that have an updated version in the file database, wherein the one or more updated files comprise one or more updated configuration files or an updated personalized executable file; and
   sending, by the application management computing device, at least the one or more updated files to the client device, wherein the one or more updated files are configured to cause the client device to operate the updated version of the requested software application.

2. The method of claim 1, further comprising:
   determining, by the application management computing device, whether the identified user has an account stored in a user database; and
   retrieving, by the application management computing device, user profile information associated with the identified user from the user account.

3. The method of claim 1, further comprising receiving, by the application management computing device, user preference information from the user and storing the received user preference information in an account associated with the user in a user database.

4. The method of claim 1, further comprising storing by the application management computing device, information of the sent personalized executable file to an account associated with the user.

5. The method of claim 4, further comprising:
   receiving, by the application management computing device, an update request from the client device to receive an updated version of the software application;
   processing, by the application management computing device, the update request and retrieving information of the sent personalized executable file from the user database to identify the one or more files associated with the previously sent software application that have an updated version in the file database; and
   retrieving, by the application management computing device, the one or more updated files from the file database.

6. The method of claim 1, wherein the user profile information includes service subscription information associated with the user and the client device.

7. The method of claim 1, further comprising:
   requesting, by the application management computing device, preference information of the user via the client device regarding one or more user preferences;
   receiving, by the application management computing device, information from the user via the client device; and
   updating, by the application management computing device, the user profile of the user with the received information and storing the updated user profile in the user's account.

8. A non-transitory machine readable medium having stored thereon instructions for providing a personalized executable file to a client device, comprising machine executable code which when executed by at least one machine, causes the machine to:

processing a received request sent from a client device to obtain a software application, wherein the processing comprises identifying the client device and a user associated with the client device;

determining client device profile information associated with the identified client device and user profile information associated with the identified user;

selecting one or more core library files based on at least the determined client device profile information and subscription information associated with the user and one or more configuration files based on at least the determined user profile information and the subscription information associated with the user for the requested software application from a file database;

generating a custom personalized executable file of the requested software application, wherein the personalized executable file comprises the one or more selected core library files associated with the determined client device profile information and the one or more selected configuration files associated with the determined user profile information;

sending the personalized executable file of the requested software application to the client device;

identifying one or more updated files associated with the previously sent personalized executable file of the requested software application that have an updated version in the file database, wherein the one or more updated files comprises one or more updated configuration files or an updated personalized executable file; and sending at least the one or more updated files to the client device, wherein the one or more updated files are configured to cause the client device to operate the updated version of the requested software application.

9. The non-transitory machine readable medium of claim 8 further comprising:

determining whether the identified user has an account stored in a user database; and retrieving user profile information associated with the identified user from the user's account.

10. The non-transitory machine readable medium of claim 8 further comprising, receiving user preference information from the user and storing the received user preference information in an account associated with the user in a user database.

11. The non-transitory machine readable medium of claim 8 further comprising, storing information of the personalized executable file in an account associated with the user in a user database.

12. The non-transitory machine readable medium of claim 11 further comprising, receiving an update request from the client device to receive an updated version of the software application, processing the update request and retrieve information of the sent personalized executable file from the user database to identify the one or more files associated with the previously sent software application that have an updated version in the file database;

retrieving the one or more updated files from the file database.

13. The non-transitory machine readable medium of claim 8, wherein the user profile information includes service subscription information of the user and the client device.

14. An application management computing device comprising:

a processor;

a memory, wherein the memory coupled to the processor which are configured to execute programmed instructions stored in the memory comprising:

processing a received request sent from a client device to obtain a software application, wherein the processing comprises identifying the client device and a user associated with the client device;

determining client device profile information associated with the identified client device and user profile information associated with the identified user;

selecting one or more core library files based on at least the determined client device profile information and subscription information associated with the user and one or more configuration files based on at least the determined user profile information and the subscription information associated with the user for the requested software application from a file database;

generating a custom personalized executable file of the requested software application, wherein the personalized executable file comprises the one or more selected core library files associated with the determined client device profile information and the one or more selected configuration files associated with the determined user profile information;

sending the personalized executable file of the requested software application to the client device via the network interface;

identifying one or more updated files associated with the previously sent personalized executable file of the requested software application that have an updated version in the file database, wherein the one or more updated files comprises one or more updated configuration files or an updated personalized executable file; and sending at least the one or more updated files to the client device, wherein the one or more updated files are configured to cause the client device to operate the updated version of the requested software application.

15. The device of claim 14, wherein the processor is further configured to execute programmed instructions stored in the memory further comprising:

determining whether the identified user has an account stored in a user database; and retrieving user profile information associated with the identified user from the user's account.

16. The device of claim 14, wherein the processor is further configured to execute programmed instructions stored in the memory further comprising receiving user preference information from the user and store the received user preference information in an account associated with the user in a user database.

17. The device of claim 14, wherein the processor is further configured to execute programmed instructions stored in the memory further comprising storing information of the personalized executable file in an account associated with the user in a user database.

18. The device of claim 17, wherein the processor is further configured to execute programmed instructions stored in the further comprising:

receiving an update request from the client device to receive an updated version of the software application, processing the update request and retrieve information of the sent personalized executable file from the user database to identify one or more files associated with the previously sent software application that have an updated version in the file database;

retrieving the one or more updated files from the file database.

19. The device of claim 18, wherein the user profile information includes service subscription information of the user and the client device.

* * * * *